Feb. 1, 1927.
H. K. HITCHCOCK
1,615,840
APPARATUS FOR MAKING SHEET GLASS
Filed Feb. 5, 1925
4 Sheets-Sheet 2

INVENTOR
H. K. Hitchcock
by
James C. Bradley
atty.

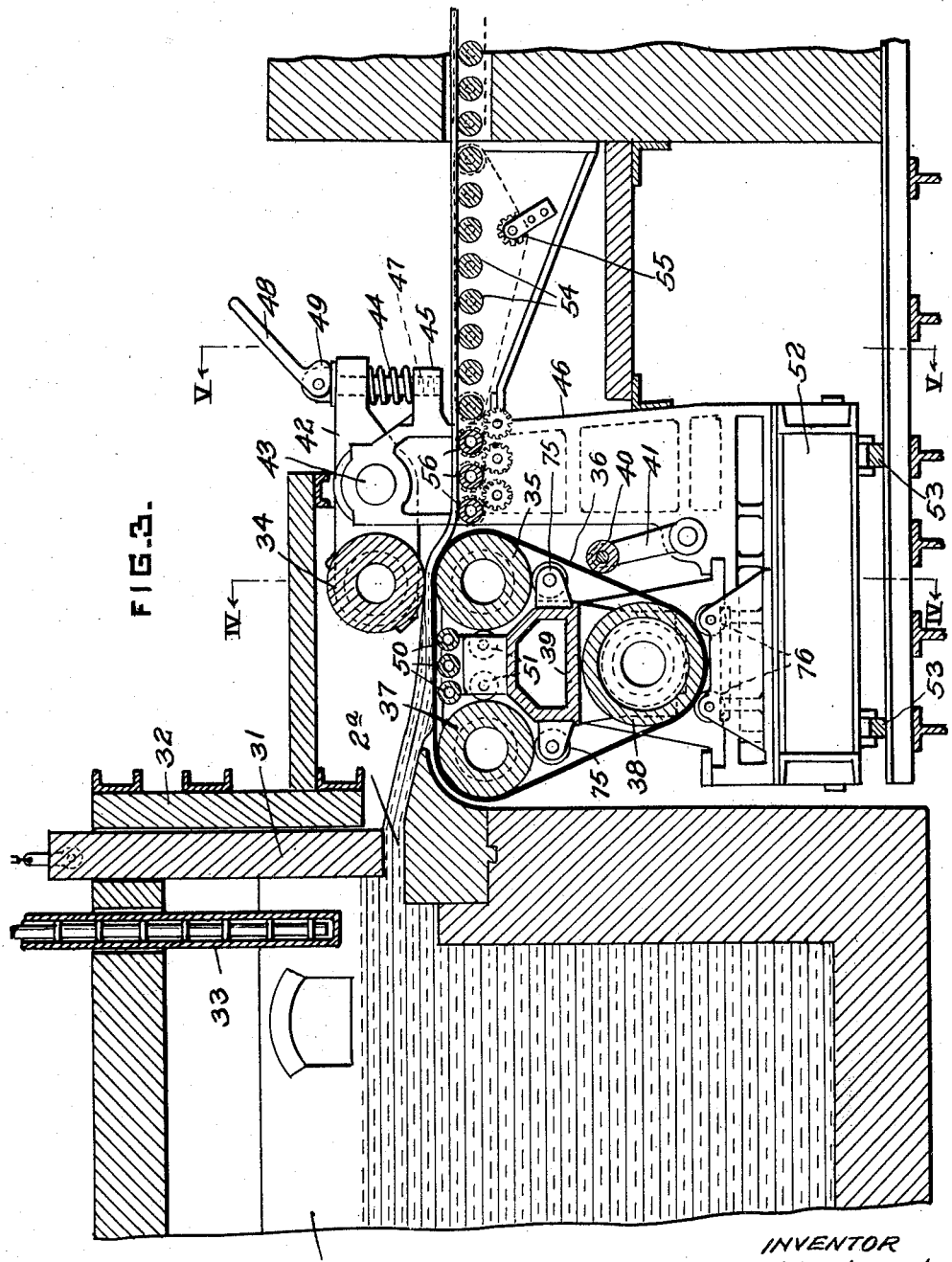

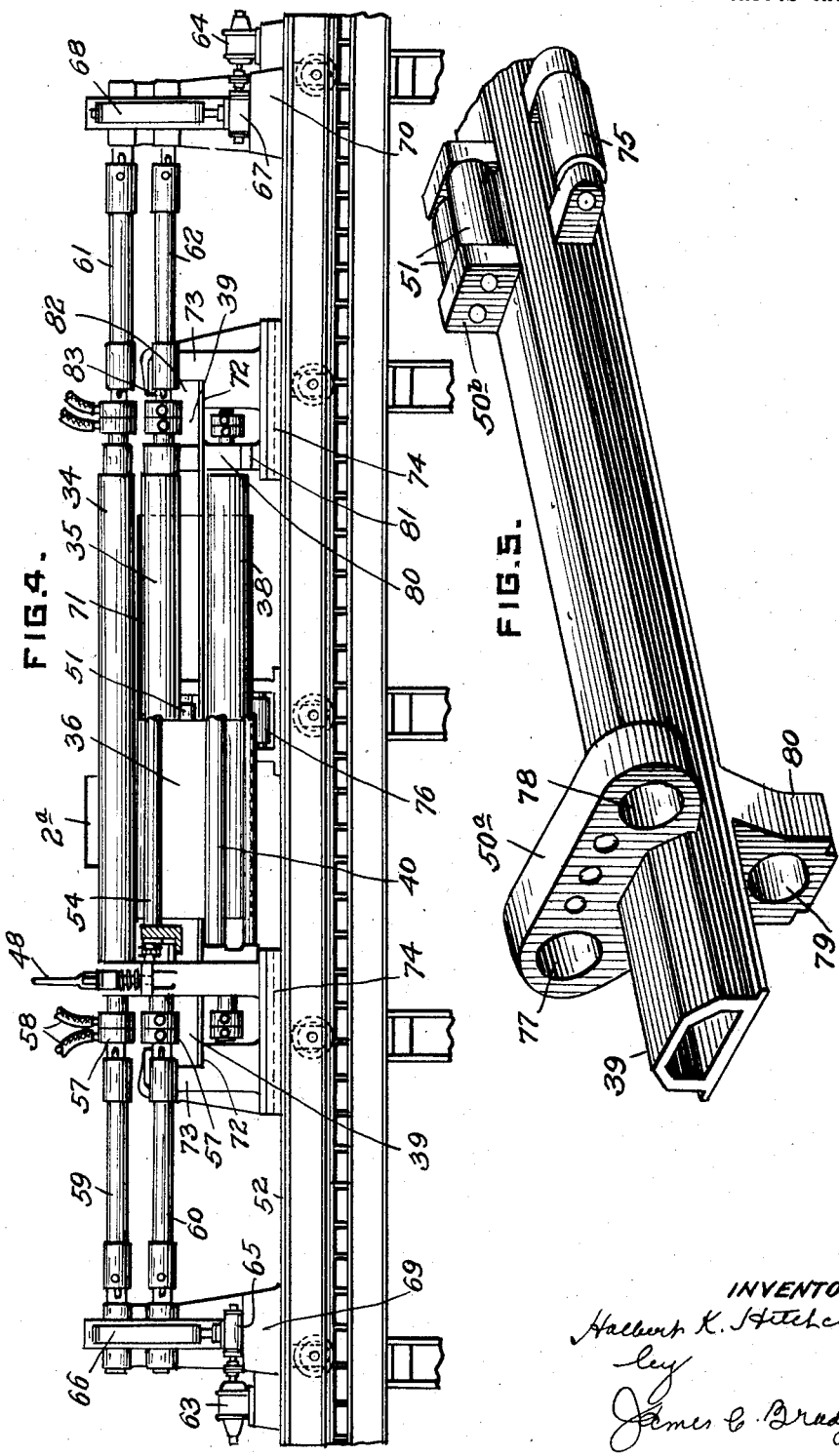

Patented Feb. 1, 1927.

1,615,840

UNITED STATES PATENT OFFICE.

HALBERT K. HITCHCOCK, OF PITTSBURGH, PENNSYLVANIA, ASSIGNOR TO HITCHCOCK EXPERIMENT COMPANY, A CORPORATION OF NEW JERSEY.

APPARATUS FOR MAKING SHEET GLASS.

Application filed February 5, 1925. Serial No. 7,038.

Figure 1:
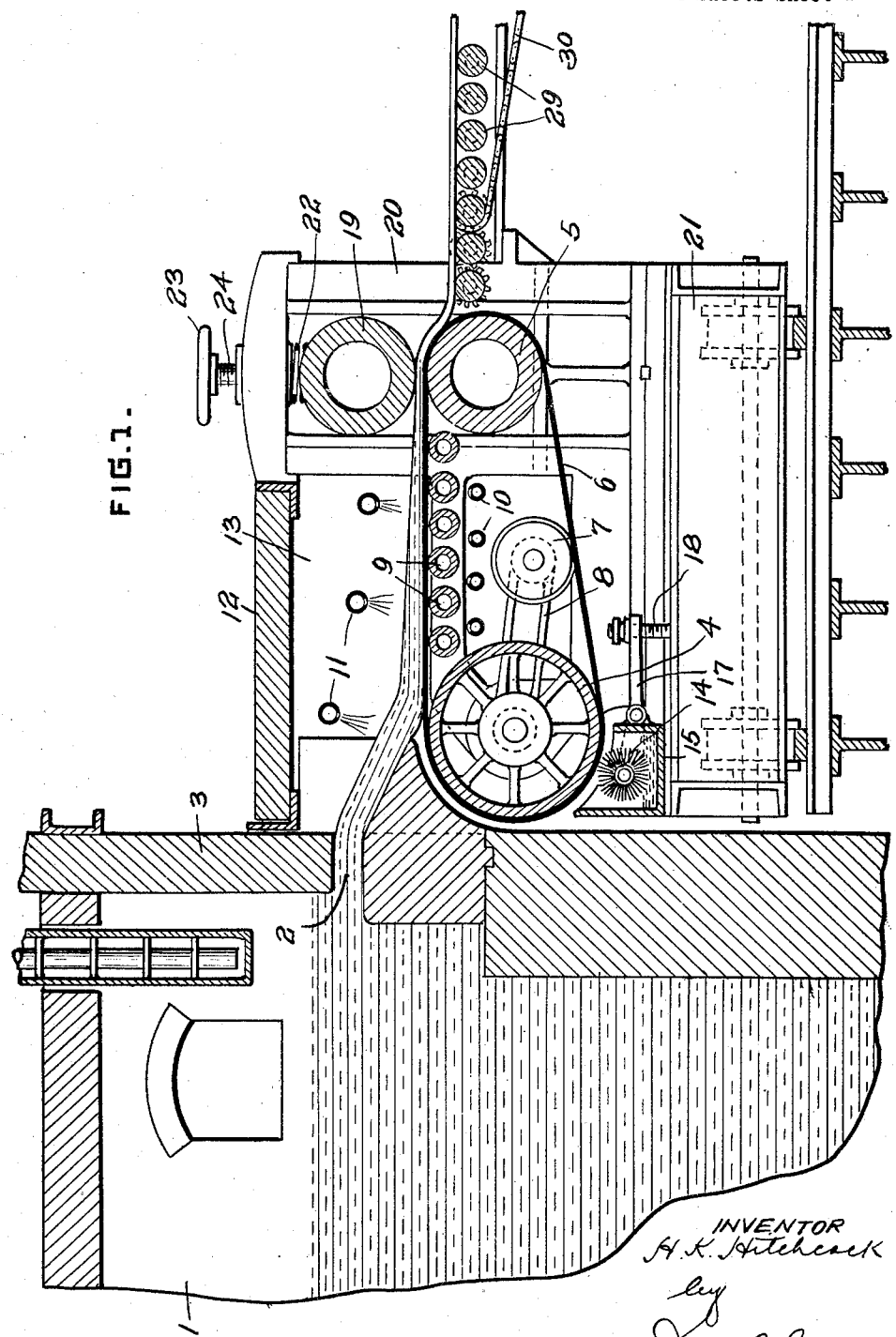
Figure 2:
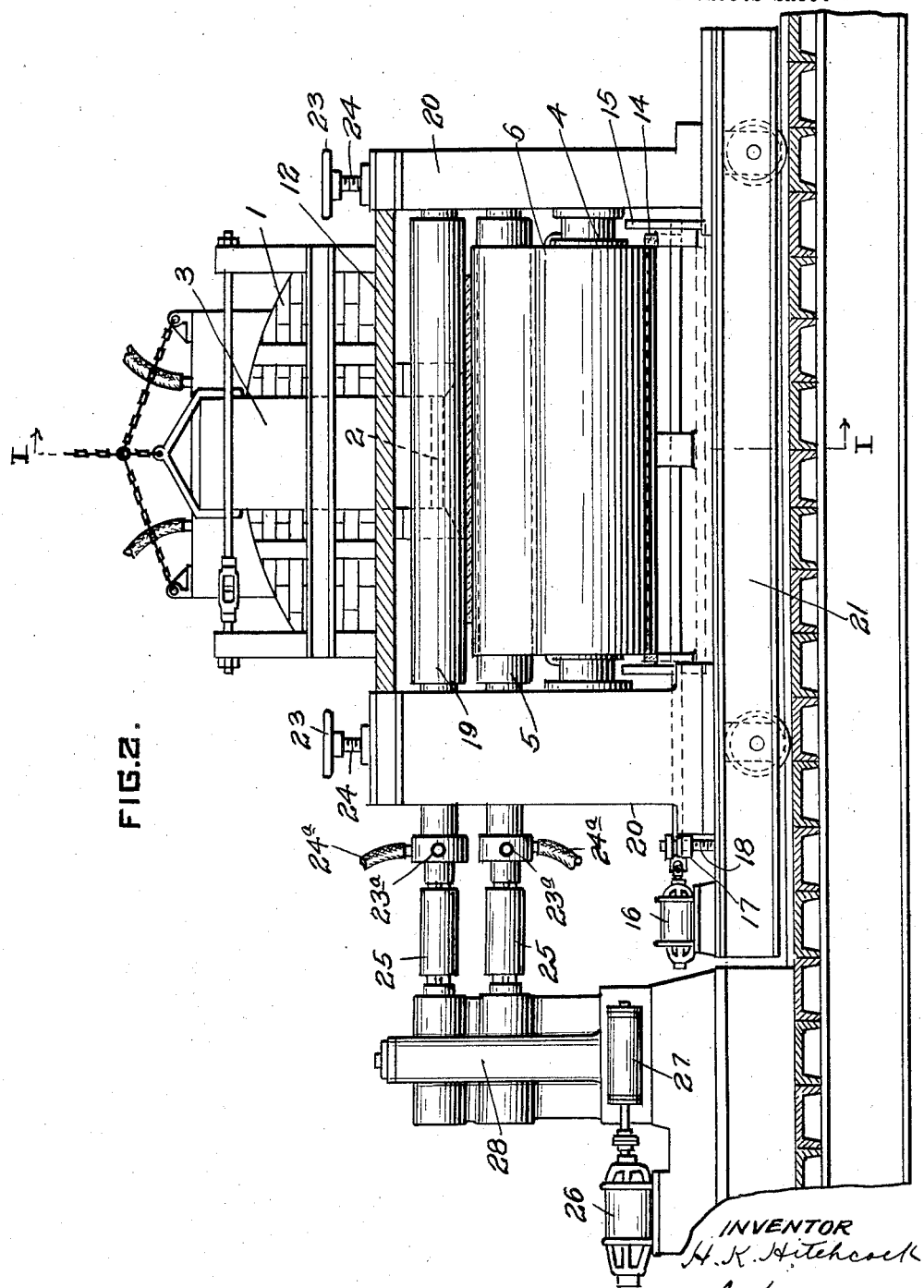

The invention relates to an apparatus for making sheet glass directly from a tank in a continuous ribbon or band. It has for its principal objects, (1) the provision of an apparatus wherein any stretching of the glass and consequent elongation of the bubbles therein is avoided, and (2) the provision of an apparatus wherein it is possible to regulate the temperature in the glass sheet preliminary to sizing in such manner that mechanical ream, due to too rapid cooling of the molten glass, is avoided on the one hand, and devitrification, due to too slow cooling of the molten glass, through a certain known range of temperatures is avoided on the other hand. Briefly stated, this temperature regulation is made possible by the use of an endless belt preferably of thin metal upon which the glass is directed from the outlet slot of the tank preliminary to the sizing operation. The temperature of the glass layer upon this belt intermediate the rear end, which receives the glass, and the forward end, where the glass is sized, can be regulated to a nicety by temperature controlling means applied below the belt and also by other means applied above the glass, the thin metal belt lending itself perfectly to this regulation of temperatures, so that the glass is not too greatly chilled at any one point, and on the other hand is not too slowly cooled through the danger zone where devitrification is liable to occur. The portion of the belt which carries the glass is suitably supported by rolls or a table and the sizing or dimensioning of the sheet is accomplished by means of a roll, preferably located above the forward end of the belt in opposition to the roll or pulley around which the belt extends at such end, although the sizing roll might be placed in opposition to some other roll beneath the upper belt flight. Provision is also preferably made for polishing and cooling the belt and for removing the belt and replacing it without interrupting the operation of the apparatus. Certain embodiments of the invention are illustrated in the accompanying drawings wherein:

Figure 1 is a longitudinal vertical section through the apparatus and the end of the glass tank with which the apparatus is used, such section being taken on the line I—I of Fig. 2. Fig. 2 is a front elevation. Fig. 3 is a section similar to that of Fig. 1 of a modification. Fig. 4 is a half section on the line IV—IV and a half section on the line V—V of Fig. 3. And Fig. 5 is a perspective view of one end of the bridge construction employed in the apparatus of Figs. 3 and 4.

Referring to the construction of Figs. 1 and 2, 1 is the delivery end of a glass melting tank, preferably of the regenerator type having an outlet opening or slot 2 through its side wall controlled by the outlet gate 3, such outlet gate being vertically movable from above by suitable operating means, not shown. Immediately in front of the slot is a receiving table comprising the rolls 4 and 5, provided with an endless sheet metal belt 6. This belt is preferably of steel and highly polished, although, if desired, any other suitable metal or composition might be employed. It is kept under tension by means of the roll 7, resting upon the lower flight and maintained in position by the arms 8, pivoted to the axle of the roll or pulley 4. The upper flight of the belt which acts as the casting table is preferably maintained against sagging by means of the transverse rolls 9 which are preferably fluid cooled. Beneath these rolls are a plurality of transverse pipes 10 supplied with air under pressure and perforated along their upper sides so that jets of air are directed upwardly against the lower side of the belt and against the rolls 9. Means are thus provided for regulating the temperature of the upper flight of the belt throughout its length, and this temperature is readily controlled and adjusted by reason of the thin metal belt which responds to temperature changes upon the lower side and transmits such conditions to the glass moving along with the belt. A further regulation of the temperature of the layer of glass upon the belt is secured by means of the burners 11, which extend transversely of the glass and are supplied with air and gas under pressure. The heat above the glass is conserved by means of the removable cover 12, which has depending sides 13 in which the burner pipes are mounted.

In order to keep the belt in a highly polished condition and coat it with graphite or other material to reduce the tendency of the glass to stick thereto, the brush 14 is used mounted for rotation in the trough 15 which contains the coating material. This brush is driven by the motor 16 mounted at one end of the brush shaft and having driving connection therewith. The brush shaft is preferably supported upon a pair of pivoted arms 17 provided with adjusting screws 18, whereby the relation of the brush to the belt may be adjusted to compensate for wear.

As indicated in Fig. 2, the outlet slot 2 is relatively narrow as compared with the width of the belt and with the width of the glass sheet which is formed, the flow of glass from the slot being of such volume that the glass spreads out laterally in fan shape upon the forwardly moving belt, so that by the time the layer of glass reaches the sizing rolls, it has attained the desired width. One advantage of the relatively narrow slot 2 as compared with a shallower slot of the full width of the sheet to be formed, lies in the fact that the narrow slot gives less area of contact with the glass than the shallow slot and consequently less contamination of the glass due to washing.

Located above and in opposition to the roll 5 is a sizing or dimensioning roll 19, both rolls being carried in the standards 20 placed at opposite sides of the truck 21, upon which the apparatus is mounted for movement transversely of the line of movement of the glass. The sizing roll is mounted in suitable bearings carried by the standards 20 and yieldingly pressed down by means of springs 22, whose tension may be regulated by means of the hand wheels 23 carrying the screws 24. The rolls 5 and 19 are provided at their ends with the swivels 23ª, to which flexible supply pipes 24ª are connected (Fig. 2), so that the rolls may be cooled by circulating a flow of water or other cooling fluid therethrough. The outer ends of the roll shafts are connected to the tumbler shafts 25 and these are driven from the motor 26 through the intermediary of suitable roller gearing located in the casings 27 and 28. The glass is reduced to uniform thickness between the rolls 5 and 19 and delivered upon the table 29, whose rollers are driven by means of the chain 30, a suitable leer being arranged at the forward end of the table to receive the glass and continuously anneal and cool it, so that it may be cut off and handled at the end of the leer remote from the table, this being a detail of construction and operation which is immaterial in so far as the present invention is concerned. In operating the apparatus as above described for continuously forming the sheet of glass, there is no tendency to stretch the glass and thus lengthen any bubbles which may be contained therein, since the endless belt carries the glass to the sizing roll at a speed corresponding closely to the natural flow of the glass onto the belt as caused by gravity, and after the layer of the glass is in position upon the belt, it is carried forward by such belt at the same rate of movement as the peripheral rate of movement of the roll 19, so that there is no tendency of the roll to drag the sheet along the belt at an increased speed and thus stretch it. Since there is little or no stretching force applied to the glass upon the belt, it is not necessary to chill a thick, strong film or skin on the bottom of the sheet as is the case where a stationary table is used, so that the operation affords less opportunity for the formation of mechanical ream, such as occurs where a thick heavy skin is chilled upon a moving body of semi-fluid glass. The cooled roller supports, in conjunction with the air pipes 10, also permit of a delicate control of the cooling action of the belt upon the layer of glass extending from the rear end of the upper flight of the belt to the forward end, so that no difficulty is experienced in avoiding a rate of cooling at the danger zone, such as might otherwise cause devitrification. It is thus possible by the use of the apparatus (1) to avoid stretching the glass to elongate any bubbles therein, (2) to avoid the formation of mechanical ream incident to the formation of a heavy skin of chilled glass, and (3) to avoid the danger of devitrification incident to too slow cooling through a certain known range at which this action is liable to occur.

Figs. 3 and 4 illustrate a modification of the invention wherein provision is made for removing and replacing the endless steel belts employed as casting tables without discontinuing the operation of the apparatus. This is accomplished by employing two endless belts side by side upon the roller supports and by mounting the belts and their operating mechanism upon a car or truck movable transversely of the outlet slot from the tank, so that the belts may be shifted with the truck so as to carry a belt which has been in use, and which it is desired to remove from beneath the ribbon of glass flowing from the tank and at the same time to bring the second belt into position beneath the ribbon. This construction requires that driving means be employed at both ends of the belt supports and sizing roll, so that while a belt is being removed at one end, requiring disconnection of the driving means, the drive may be continued at the other end. It also requires that provision be made for supporting the belt carrying rolls or supports and the sizing roll so that they are maintained in position during the removal of a belt which involves the partial release of the support of the rolls at the ends over which the belt is being removed.

The tank construction of Fig. 3, corresponds to that of Fig. 1, except that the control gate 31 is used to the rear of an arch 32 constituting a part of the front wall of the tank. As in the other type of construction, a water cooled gate or cut-off 33 is provided to the rear of the control gate, being brought into service in emergencies or when it is desired to completely cut off the flow of glass from the tank. As in the other type of machine, the sizing roll 34 is employed above the roll 35 at the forward end of the upper flight of the sheet metal belt 36. In this construction, however, there are three belt supporting rolls instead of only two as in the other construction, the other two rolls 37 and 38 being arranged with respect to the roll 35 so as to form a triangle and thus provide a space for the bridge 39, the purpose of which is later described. Any slack in the belt is taken up by means of the roll 40 carried by the arm 41 and brought into yielding engagement with the belt by means of suitable operating means, not shown. The roll 34 is journalled at its ends in a pair of levers 42 pivoted at 43 and is yieldingly pressed downward by means of the springs 44 lying between the ends of the levers and suitable abutments 45 carried by the standards 46. Extending upward from the abutments through the ends of the arms 42 are the screws 47 carrying at their upper ends the levers 48 provided with the cams 49. When the arms 48 are swung downward, the ends of the levers 42 are forced down against the springs 44 and the roll 34 is lifted out of engagement with the glass.

As in the other type of construction, the upper flight of the belt is supported by the fluid cooled rolls 50, and in this case, these rolls are carried by the brackets 50$^a$ on the bridge 39 (Fig. 5). Other brackets 50$^b$ at the center of the bridge carry a pair of rolls 51 bearing against the rolls 35 and 37 midway between their ends, thus giving the rolls additional support against deformation, this being important in this apparatus wherein the rolls are substantially twice as long as those of the Fig. 1 construction for the reason as later explained. The framework which supports the rolls and the standards 46 are carried upon a truck body 52 mounted on the track 53 to permit the shifting of the machine from one belt to another and to permit the removal of the apparatus from the front of the furnace for replacements or repairs. Forward of the standards 46 which carry the levers 42 is a roller table 54 whose rolls are driven from suitable drive means 55, and intermediate such table and the sizing roll 34 is a series of cooled rolls 56 suitably driven for supporting the glass in its passage from the belt to the table.

The rolls 34 and 35 are provided at their ends with swivels 57 and suitable water pipes 58 and are driven by means of the tumbler shafts 59 and 60 at one end of the rolls and the tumbler shafts 61 and 62 at the other end. These tumbler shafts are driven from the motors 63 and 64 operating through suitable reducing gearing in the casings 65 and 66 and 67 and 68, the motors and reducing gearing being carried by pedestals 69 and 70, in which are horizontal stub shafts driven from the gearing and coupled to the tumbler shafts above referred to. These pedestals are mounted upon the truck body 52, so that the entire apparatus is moved as a unit. The rolls 35, 37 and 39 which carry the endless belt 36 and the sizing rolls 34 are of a length somewhat greater than twice the width of the belt, thus giving room for a second belt 71 alongside the belt 36, the arrangement being such that when it is desired to replace the belt 36 by the belt 71, the truck is shifted to the left (Fig. 4) carrying the belt 36 to the left of the outlet slot 2$^a$ and bringing the belt 71 beneath such slot. This shifting operation can be carried on without discontinuing the flow of glass from the outlet slot and the construction is such, as will now be pointed out, that the belt 36 can be removed from the machine and a new belt put in place without stopping the operation of the machine, the drive through the tumbler shafts 61 and 62 being continued while the tumbler shafts 59 and 60 are disconnected in order to take off the belt 36.

The bridge 39 which is designed to give support to the rolls during the period when one belt, such as the belt 36, is being removed, and another one is being substituted, extends out past the ends of the rolls a substantial distance, as indicated in Fig. 2, and is supported at such ends at 72 in the standards 73, such standards being slidably mounted in guides 74, so that the standards may be slid outward from the positions indicated in Fig. 2. The bridge carries at its central portion a pair of brackets 75 provided with rollers engaging the rolls 35 and 37 and supporting them at these points (Fig. 3). The bottom roll 37 is also supported at its central portion by the rolls 76 carried by the bottom of the truck. The bridge also carries adjacent each of its ends, as indicated in Fig. 5, a spider-like portion provided with the journals 77, 78 and 79, adapted to receive the axles of the rolls 35, 37 and 38, and the lower extensions 80 of these spider members are adapted to engage and be supported by the abutments 81 carried by the standards 73, so that when these standards are in their inner positions, as illustrated in Fig. 4, the bridge is firmly supported at both ends by the shoulders or abutments 72 and 81.

When it is desired to remove one of the belts, such as the belts 36, the standard 73 is slid to the left, thus bringing it from beneath the end of the bridge at 72 and also bringing the abutment 81 from beneath the downwardly extending part 80 (Fig. 5), the tumbler shafts 59 and 60, of course, being disconnected and removed at this time. This movement of the standard 73 to the left gives sufficient room to remove the belt 36, since the spider member shown in Fig. 5 all lies within the area described by the belt in end elevation, and a new belt may be slipped into position. The rolls 35, 37 and 38, are at this time not as well supported as they were before the standard 73 was moved to the left, but they are sufficiently supported because of the rigidity of the bridge and because of the support of the entire set of rolls incident to the engagement of the rolls 76 with the belt in opposition to the roll 38. The roll 38 is thus supported at its center and it in turn gives support to the rolls 35 and 37 because of the fact that they are all mounted in the spider member (Fig. 5) at the end of the rolls which still remains in place. Some additional support is also afforded at this time incident to the fact that the bridge is supported at 81 from beneath and is held against upward movement at 82 where the end of the bridge extends beneath the hook portion 83 of the standard 73, as indicated at the right hand side of Fig. 4. Provision is thus made for the removal of a belt and its replacement while the other belt is still in operation, so that the machine need never discontinue operation because of the failure of one of the belts.

As heretofore indicated, the belt is preferably of sheet metal, but the invention is not limited in this particular, as some other form of belt such as asbestos, might be used, the only requirement being that it be flexible sheet material and present a relatively smooth continuous surface for the reception of the glass.

What I claim is:

1. The combination with a glass tank having an outlet slot, of an endless belt of flexible sheet material with its upper flight in position to receive the glass from said slot, a roll over which the upper flight of the belt passes, and a sizing or dimensioning roll in opposition to said roll, the axes of said rolls being in the same plane lying at substantially a right angle to the line of travel of the glass.

2. The combination with a glass tank having an outlet slot, of an endless belt of flexible sheet material with its upper flight in position to receive the glass from said slot, a roll over which the upper flight of the belt passes, a sizing or dimensioning roll in opposition to said roll, and means for cooling said rolls.

3. The combination with a glass tank having an outlet slot, of an endless belt of flexible sheet material with its upper flight in position to receive the glass from said slot, a roll over which the upper flight of the belt passes, a sizing or dimensioning roll in opposition to said roll, and means for cooling said belt.

4. The combination with a glass tank having an outlet slot, of an endless belt of flexible sheet material with its upper flight in position to receive the glass from said slot, a roll over which the upper flight of the belt passes, a sizing or dimensioning roll in opposition to said roll, and means for cooling said rolls, and said belt.

5. The combination with a glass tank having an outlet slot, of an endless belt of flexible sheet material with its upper flight in position to receive the glass from said slot, a roll over which the upper flight of the belt passes, a sizing or dimensioning roll in opposition to said roll, means above the glass for cooling it, and means for cooling the belt.

6. The combination with a glass tank having an outlet slot, of an endless belt of flexible sheet material with its upper flight in position to receive the glass from said slot, a roll over which the upper flight of the belt passes, a sizing or dimensioning roll in opposition to said roll, means above the glass for cooling it, and means for cooling the belt and rolls.

7. The combination with a glass tank having an outlet slot, of an endless belt of flexible sheet material with its upper flight in position to receive the glass from said slot, a roll over which the upper flight of the belt passes, a sizing or dimensioning roll in opposition to said roll, and temperature regulating means located beneath said upper flight.

8. The combination with a glass tank having an outlet slot, of an endless belt of flexible sheet material with its upper flight in position to receive the glass from said slot, a roll over which the upper flight of the belt passes, a sizing or dimensioning roll in opposition to said roll, and cooling means for said upper flight located beneath it.

9. The combination with a glass tank having an outlet slot, of an endless belt of flexible sheet material with its upper flight in position to receive the glass from said slot, a roll over which the upper flight of the belt passes, supporting means for said flight therebeneath for preventing it from sagging, and a sizing or dimensioning roll in opposition to said roll with the axes of the two rolls in substantially vertical alignment.

10. The combination with a glass tank having an outlet slot, of an endless belt of flexible sheet material with its upper flight in position to receive the glass from said slot, a roll over which the upper flight of the belt passes, supporting means for said flight therebeneath for preventing it from sagging, means for cooling said supporting means, and a sizing or dimensioning roll in opposition to said roll.

11. The combination with a glass tank having an outlet slot, of an endless belt of flexible sheet material with its upper flight in position to receive the glass from said slot, a roll over which the upper flight of the belt passes, fluid cooled supporting rolls beneath said upper flight, and a sizing or dimensioning roll in opposition to said roll.

12. The combination with a glass tank having an outlet slot, of an endless belt of sheet metal with its upper flight in position to receive the glass from said slot, a roll over which the upper flight of the belt passes, means for polishing said belt, and a sizing or dimensioning roll in opposition to said roll.

13. The combination with a glass tank having an outlet slot, of an endless belt of flexible sheet material with its upper flight in position to receive the glass from said slot, a roll over which the upper flight of the belt passes, means for applying a coating to said belt, and a sizing or dimensioning roll in opposition to said roll.

14. The combination with a glass tank having an outlet slot, of an endless belt of flexible sheet material with its upper flight in position to receive the glass from said slot, roller supports for the belt, including a roll at the forward end of the upper flight, a sizing or dimensioning roll in opposition to said roll, a second endless belt similar to the first one extending around the same belt supports, and a supporting framework for said belt supports and sizing roll mounted for movement transversely of the slot so that either belt may be brought into position to receive the glass.

15. The combination with a glass tank having an outlet slot, of an endless belt of flexible sheet material with its upper flight in position to receive the glass from said slot, roller supports for the belt, including a roll at the forward end of the upper flight, a sizing or dimensioning roll in opposition to said roll, a second endless belt similar to the first one extending around the same belt supports, a supporting framework for said belt supports and sizing roll mounted for movement transversely of the slot so that either belt may be brought into position to receive the glass, and releasable driving means for the belt supports and the sizing roll at both ends thereof to permit of the driving of such supports and roll from either end while the driving means at the other end are disconnected to permit of the removal and replacement of one of the belts.

16. The combination with a glass tank having an outlet slot, of an endless belt of flexible sheet material with its upper flight in position to receive the glass from said slot, roller supports for the belt, including a roll at the forward end of the upper flight, a sizing or dimensioning roll in opposition to said roll, a second endless belt similar to the first one extending around the same belt supports, a supporting framework for said belt supports and sizing roll mounted for movement transversely of the slot so that either belt may be brought into position to receive the glass, a bridge lying inside the belt and extending from one end of the belt supports to the other in which the ends of such supports are journalled, a standard at each end of said belt supports mounted for lateral movement on said supporting frame, in which standards, the ends of said bridge are releasably mounted, roller supporting means below one of said belt supports at the central portion thereof, and releasable driving means for the belt supports and the sizing roll at both ends thereof to permit of the driving of such supports and said roll from either end while the driving means at the other end are disconnected to permit of the removal and replacement of one of the belts.

17. The combination with a glass tank having an outlet slot, of an endless belt of sheet metal with its upper flight in position to receive the glass from said slot, a roll over which the upper flight of the belt passes, and a sizing or dimensioning roll in opposition to said roll, the axes of said rolls being in the same plane, which lies at substantially right angles to the line of travel of the glass.

In testimony whereof, I have hereunto subscribed my name this 16th day of January, 1925.

HALBERT K. HITCHCOCK.